United States Patent
McGloin et al.

(10) Patent No.: US 9,444,838 B2
(45) Date of Patent: Sep. 13, 2016

(54) PRE-PROCESSING SYSTEM FOR MINIMIZING APPLICATION-LEVEL DENIAL-OF-SERVICE IN A MULTI-TENANT SYSTEM

(71) Applicant: International Business Machines Corporation, Armonk, NY (US)

(72) Inventors: Mark McGloin, Dublin (IE); John Douglas Curtis, Milford, MA (US); Peter Otto Mierswa, Sterling, MA (US); Russell L. Holden, Boxborough, MA (US); Olgierd S. Pieczul, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 14/336,865

(22) Filed: Jul. 21, 2014

(65) Prior Publication Data

US 2016/0021136 A1    Jan. 21, 2016

(51) Int. Cl.
 *H04L 29/00* (2006.01)
 *H04L 29/06* (2006.01)
 *G06F 17/30* (2006.01)
 *G06F 9/50* (2006.01)

(52) U.S. Cl.
 CPC ........... *H04L 63/1458* (2013.01); *G06F 9/505* (2013.01); *G06F 17/30153* (2013.01); *H04L 63/1416* (2013.01); *H04L 2463/141* (2013.01)

(58) Field of Classification Search
 CPC .............................. G06F 15/173; G06F 11/30
 USPC ......................................................... 726/23
 See application file for complete search history.

(56) References Cited

U.S. PATENT DOCUMENTS

| | | | |
|---|---|---|---|
| 6,789,203 B1 * | 9/2004 | Belissent | H04L 47/10 370/229 |
| 7,043,756 B2 | 5/2006 | Tsafnat et al. | |
| 7,206,845 B2 * | 4/2007 | Banning et al. | G06F 9/505 709/226 |

(Continued)

OTHER PUBLICATIONS

IBM, "Method to manage reservation and allocation of scarce resources shared by tenants in a massively multi-tenant environment," IPCOM000188508D, Oct. 12, 2009.

(Continued)

*Primary Examiner* — Brandon Hoffman
*Assistant Examiner* — Michael D Anderson
(74) *Attorney, Agent, or Firm* — David B. Woycechowsky; David H. Judson

(57) ABSTRACT

Denial-of-service attacks are prevented or mitigated in a cloud compute environment, such as a multi-tenant, collaborative SaaS system. This is achieved by providing a mechanism by which characterization of "legitimate" behavior is defined for tenant applications or application classes, preferably along with actions to be taken in the event a request to execute an application is anticipated to exceed defined workflow limits. A set of application profiles are generated. Typically, a profile comprises information, such as a request defined by one or more request variables, one or more "constraints," one or more "request mappings," and one or more "actions." A constraint is a maximum permitted workload for the application. A request mapping maps a request variable to the constraint, either directly or indirectly. The profile information defines how a request is mapped to a workload to determine whether the request is in policy or, if not, what action to take.

14 Claims, 5 Drawing Sheets

(56) References Cited

U.S. PATENT DOCUMENTS

| | | |
|---|---|---|
| 7,207,062 B2 | 4/2007 | Brustoloni |
| 8,468,244 B2 | 6/2013 | Redlich et al. |
| 8,504,504 B2 | 8/2013 | Liu |
| 2013/0074181 A1 | 3/2013 | Singh |
| 2013/0291107 A1 | 10/2013 | Marck et al. |

OTHER PUBLICATIONS

Anonymous, "Apparatus and Method of Tenant Context Generation and Propagation in SaaS Environment," IPCOM000198980D, Aug. 19, 2010.

Anonymous, "A method of providing SSO service between on-premise application and public cloud service," IPCOM000220208D, Jul. 25, 2012.

* cited by examiner

PRE-PROCESSING SYSTEM FOR MINIMIZING APPLICATION-LEVEL DENIAL-OF-SERVICE IN A MULTI-TENANT SYSTEM

CROSS-REFERENCE TO RELATED APPLICATION

This application is related to U.S. Ser. No. 14/148,305, filed Jan. 6, 2014, titled "Preventing application-level denial-of-service in a multi-tenant system."

BACKGROUND OF THE INVENTION

1. Technical Field

This disclosure relates generally to securing information in a cloud computing or other shared deployment environment wherein disparate parties share Information Technology (IT) resources.

2. Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. Cloud compute resources are typically housed in large server farms that run networked applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines. The different components may run on different subdomains in different physical cages in different data centers in different parts of the world, all running on different hardware with different proxy, gateway or session management capabilities, and different back-end technologies.

Multiple entities (or "tenants") share the infrastructure. With this approach, a tenant's application instance is hosted and made available "as-a-service" from Internet-based resources that are accessible, e.g., through a conventional Web browser over HTTP. A cloud compute environment, such as IBM SmartCloud® for Social Business (formerly known as LotusLive), presents to the user as a single unified experience; in operation, the end user logs-in once against a centralized authentication component, and then transparently signs-on (e.g., via SAML (Security Assertion Markup Language)-based authentication and authorization techniques) into different components of the service.

While multi-tenant, collaborative SaaS (Software-As-A-Service) systems provide significant advantages, the applications supported in such infrastructure but may be subject to denial-of-service (DoS) attacks. As used herein, a "denial-of-service" refers to any degradation of a tenant's service to a point below an acceptable response time and/or transaction throughput rate, whether or not the attack leads to a full rejection of service for legitimate users. A denial-of-service may occur deliberately, namely, as a result of an intentional act, or it may occur without direct intention on the part of the accessor(s) (the calling clients) whose activity creates the situation.

Application denial-of-service is very difficult to combat with traditional mechanisms for throttling DoS attacks. Thus, for example, seemingly legitimate API calls can result in a large amount of resources consumed with the application to handle the request. Indeed, even a relatively small number of requests can tie up resources. As an example, a REST-based API can take a JSON payload to trigger a workflow, such as creating activities. When the JSON payload contains many activities, each with many sub-tasks that trigger other API calls, many resources can be tied up processing the resulting API calls. As another example, an attacker can send compressed files that will be very large when decompressed, thereby resulting in memory issues on the application server processing them.

A denial-of-service attack in a shared tenant infrastructure can have serious consequences. It may prevent legitimate users and usage of the service from continuing with acceptable response time and transaction throughput rates. Such attacks can lead to rejection of service for legitimate users and thereby create business-impacting support situations.

A denial-of-service attack prevention mechanism that works by creating profiles for accessors, and then taking actions based on limits in such profiles being reached, is described in the related application identified above. While that technique provides significant advantages, there remains a need for other types of denial-of-service attack prevention or mitigation in a shared, multi-tenant SaaS environment.

BRIEF SUMMARY

According to this disclosure, application requests are pre-processed to detect (and potentially mitigate) those that would otherwise result in denial-of-service attacks in a cloud compute environment, such as a multi-tenant, collaborative SaaS system. This goal is achieved by providing a mechanism by which a generalized characterization of "legitimate" behavior is defined for each of one or more tenant applications (or "types" of such applications), wherein the legitimate behavior typically is defined as a mapping of application functionality to acceptable workload (in terms of resource usage or performance). In a representative embodiment, a set of application "usage profiles" (or "profiles") are generated. Typically, a profile comprises a set of information, such as a "request type," one or more "request variables," one or more "constraints," one or more "request mapping(s)," and one or more "actions." A request type defines a request associated with an application or application instance, one or more other requests or request types that may be combined with the request, and the like. A request variable typically defines a characteristic of a request, such as a type of payload, a file size or type, source, time, etc. A constraint typically is a maximum permitted workload for the application. A constraint may contain some notion of time (e.g., where the constraint is applied across multiple requests). A "request mapping" maps a request variable to the constraint either directly or indirectly (e.g., by calculating a value that can be compared to the constraint). An action defines how the system will respond if the particular constraint in an application profile is triggered (or fired).

Once the application profiles are defined, a pre-processing proxy (or other such computing entity) performs an analysis, preferably on each application request (whether singularly, or combined with one or more other requests), to determine if the request (or request combination) implicates any of the constraints identified in the associated application profile(s). If any of the constraints are implicated (e.g., violated), one or more actions are then taken as necessary to address potential violation of the constraints. An action may be delaying or throttling the request, rejecting the request, restricting the request from being combined with some other request, or the like. By pre-processing requests in this manner, the cloud service provider allows for expected application functionality-to-acceptable workload patterns, but it can readily detect and mitigate or even prevent requests (or request combinations) that would otherwise cause aberrant usage of cloud resources.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
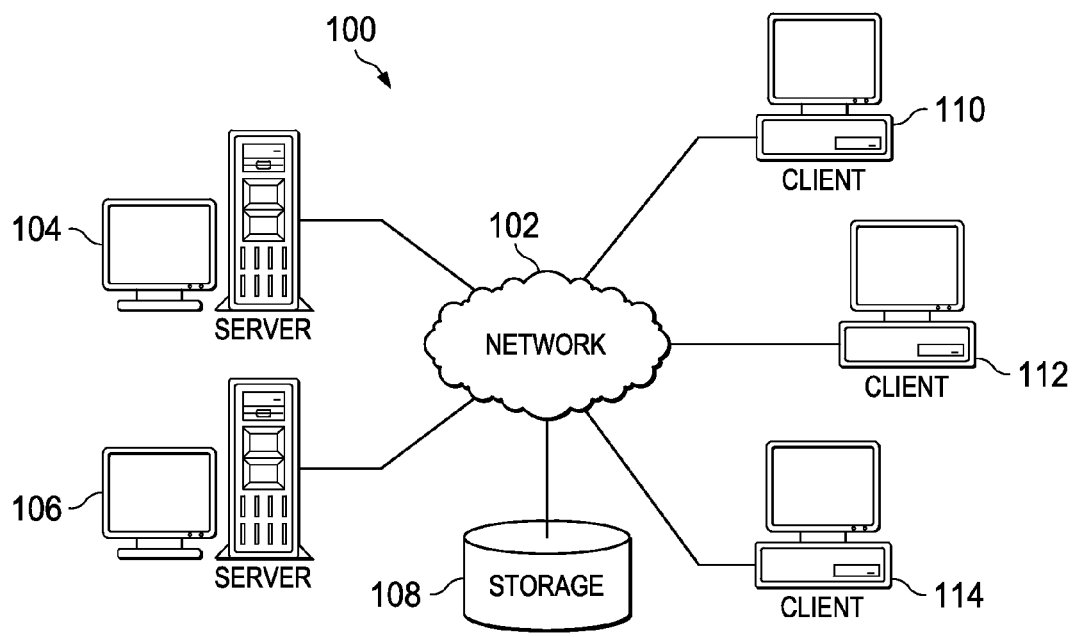
FIG. 1 depicts an exemplary block diagram of a distributed data processing environment in which exemplary aspects of the illustrative embodiments may be implemented.
Figure 2:
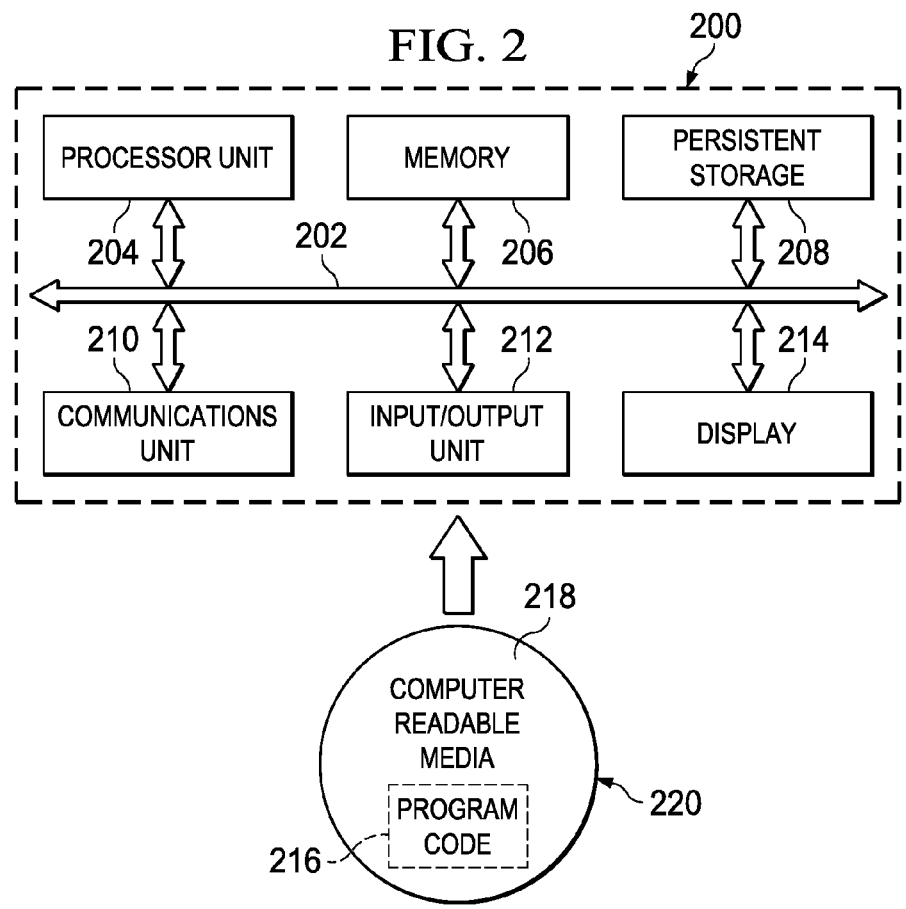
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the subject matter.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the disclosed subject matter may be written in any combination of one or more programming languages, including an object-oriented programming language such as Java™, Smalltalk, C++, C#, Objective-C, or the like, and conventional procedural programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, as used herein an "assertion" provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service. As is known in the art, a Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows.

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party and may be on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
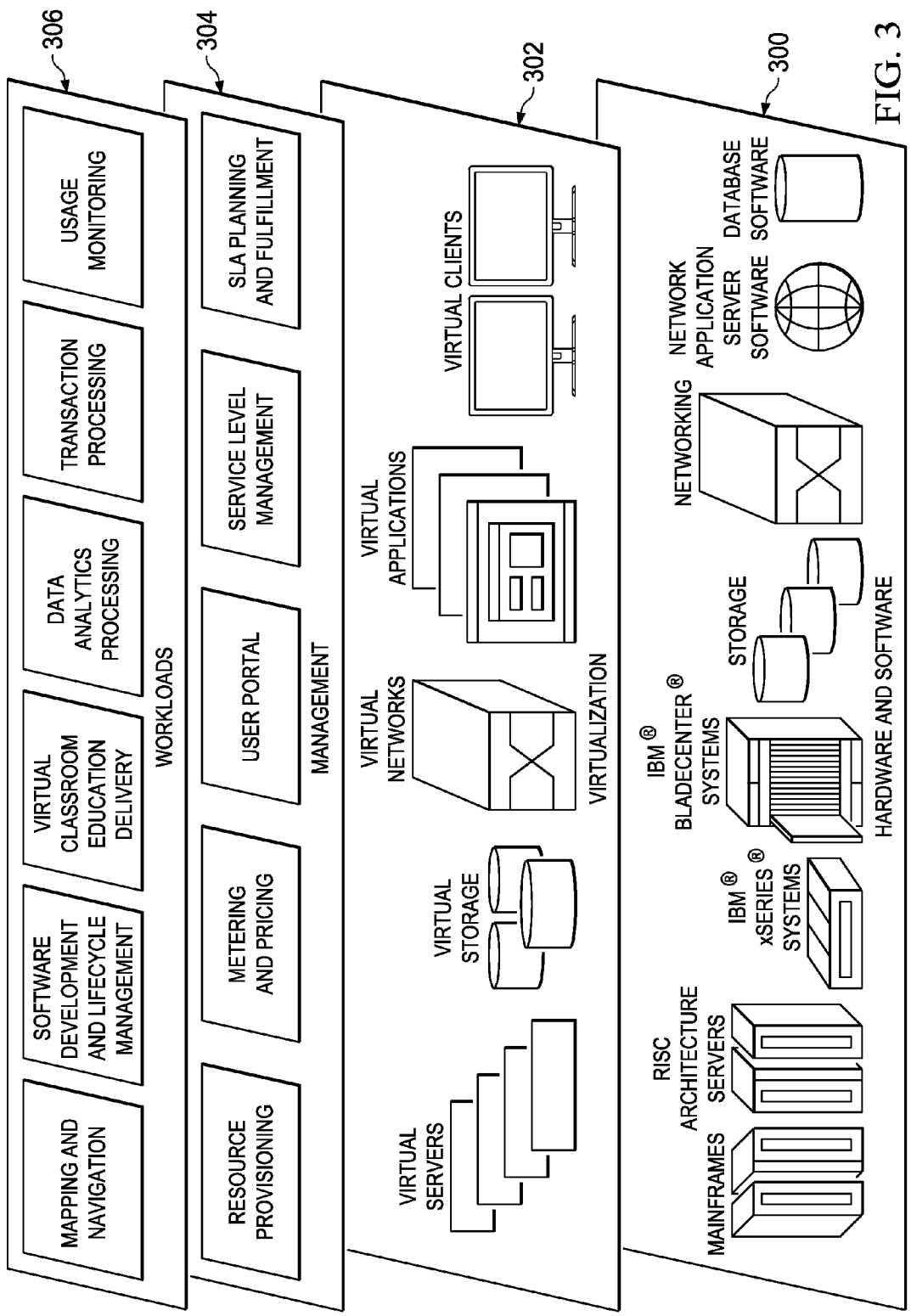
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided: Hardware and software layer 300 includes hardware and software components.

Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation;

software development and lifecycle management; virtual classroom education delivery; data analytics processing; transaction processing; and, according to this disclosure, a denial-of-service attack prevention mechanism.

It is understood in advance that although this disclosure includes a detailed description on cloud computing, implementation of the teachings recited herein are not limited to a cloud computing environment. Rather, embodiments of the disclosed subject matter are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

By way of example only, a representative enterprise application deployed in the cloud is a client-server application such as IBM® SmartCloud® for Social Business (formerly LotusLive), which provides a cloud-delivered suite of technologies that combine web conferencing, messaging, and collaboration services with social networking capabilities in an easy-to-use web-based environment. As a component of IBM® SmartCloud, Notes® provides a full-featured email, calendaring, contact management, and instant messaging. A user can access the service directly over the Internet in a number of ways, such as using a web browser, or a "rich" client application (such as the Notes rich client). Using this service, an enterprise places in the cloud service its email, calendar and/or collaboration infrastructure, and a user uses the Notes client to access his or her email, perform a calendar operation, or facilitate an online collaboration. In a representative embodiment, the Notes rich client is Version 8.5.2 or higher.

The above example (using IBM SmartCloud) is merely representative. The techniques described below are not limited for use with a particular enterprise application deployed within the cloud environment.

Figure 4:
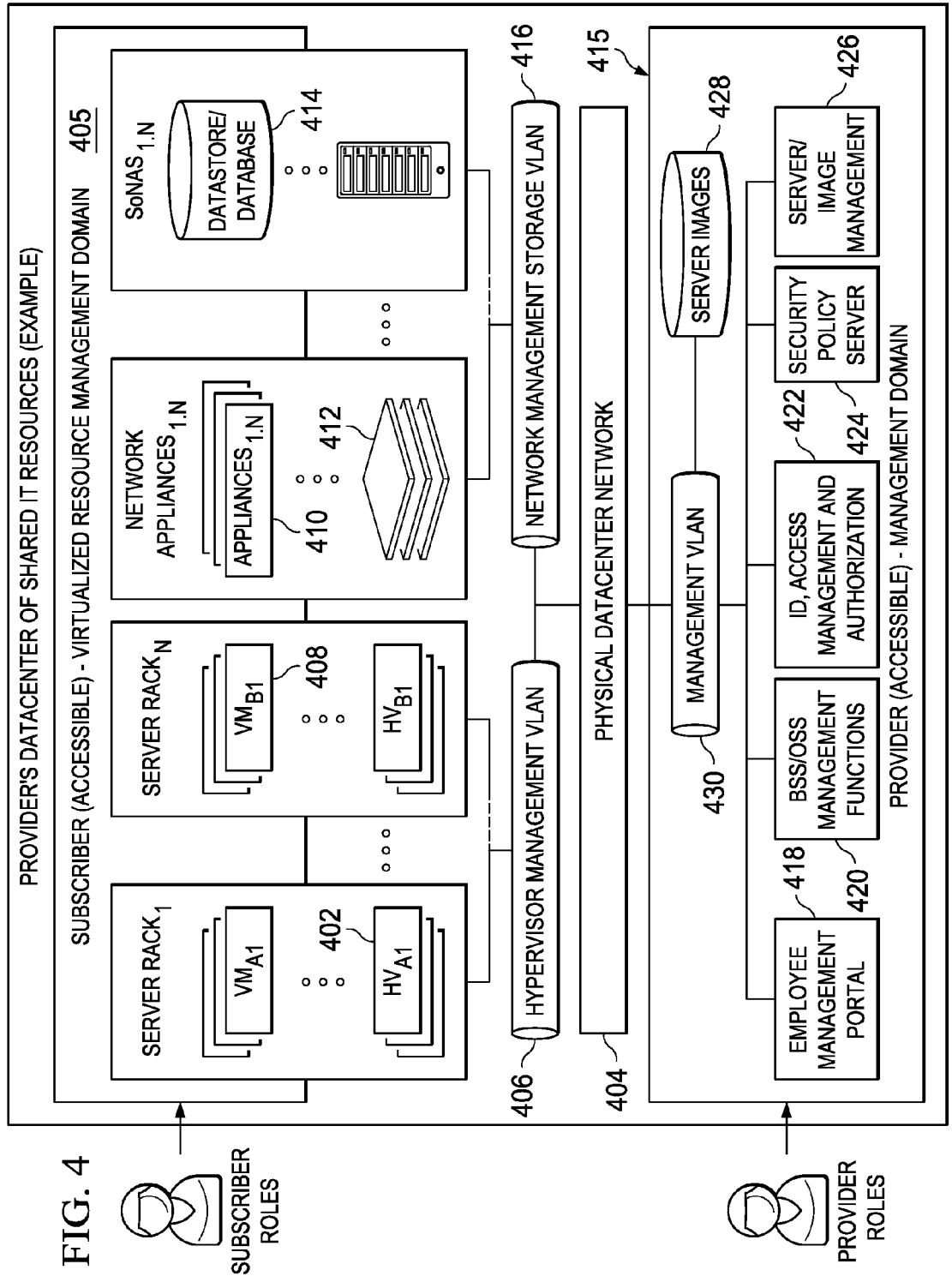
FIG. 4 illustrates an exemplary datacenter in which the denial-of-service attack prevention mechanism of this disclosure may be implemented.

FIG. 4 illustrates a typical IT infrastructure that supports virtualization of resources. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Multiple tenants share the infrastructure in a multi-tenant, collaborative SaaS system.

An "accessor" is an entity (a cloud customer or prospect, an end-user of the cloud customer, or a third party entity or end-user) that desires access to use a cloud resource.

Preventing Application-Level Denial-of-Service Attacks

Figure 5:
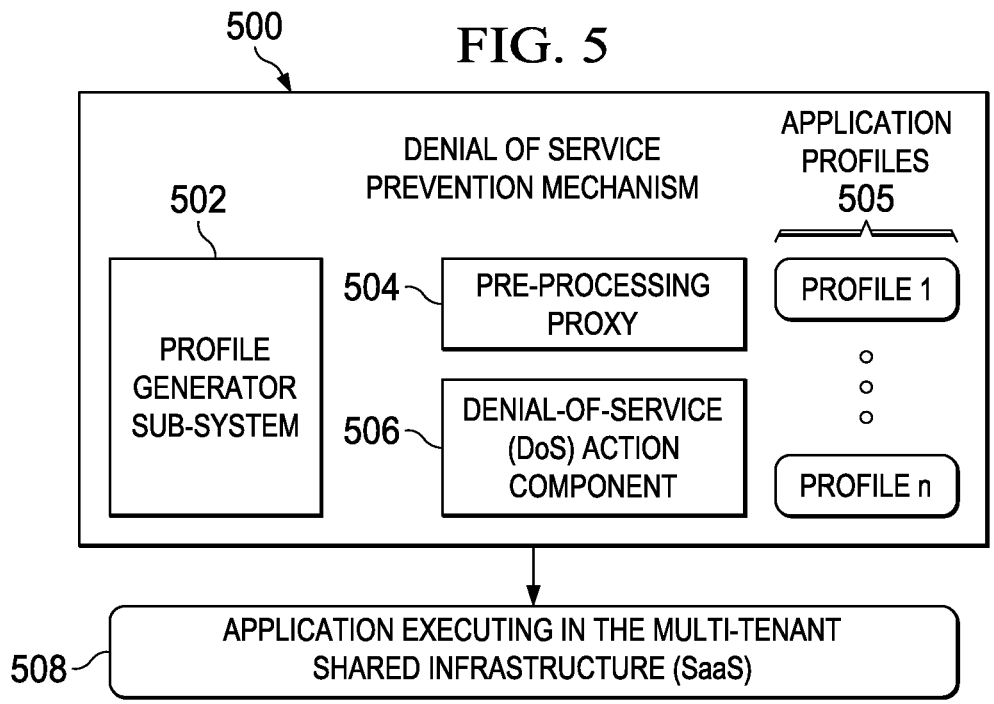
FIG. 5 illustrates a high-level block diagram of the basic components of the denial-of-service attack mechanism of this disclosure.

As illustrated in FIG. 5, the basic denial-of-service mechanism 500 of this disclosure includes three (3) primary sub-systems (or components), a profile generator sub-system (or "profile generator") 502, a pre-processing sub-system (or "pre-processing proxy") 504, and a denial-of-service (DoS) action sub-system 506. In general, the profile generator 502 is a tool by which a set of application profiles 505 are defined and stored for use by the pre-processing proxy. An "application" typically refers to a tenant application or application instance, but it may also refer to an application programming interface (API) to such an application. The pre-processing proxy 504 is the mechanism that receives application requests and analyzes those requests against the application profiles, preferably before cloud resources are accessed and/or used to respond to those requests. Based on the request analysis, the pre-processing proxy provides information (e.g., in the form of notifications) that one or more of the constraints defined in the application profile(s) are implicated by the request(s). The DoS action sub-system 506 comprises a set of control functions or operations that are implemented where potential DoS requests (as indicated by the pre-processing proxy 504) are detected. When the DoS action sub-system receives a notification from the pre-processing proxy 504 that a constraint in a profile has been fired, the sub-system 506 can take a specified action, e.g., generate a warning, delay or throttle the request, deny the request, restrict the request if combined with one or more other specified requests, suspend access, or the like. Thus, even as multiple accessors operate concurrently (and typically independently) with respect to their (multiple) tenant applications supported in the infrastructure, the result is that no one tenant application or instance ends up obtaining access to sufficient cloud resources in such a manner that a denial-of-service can take place.

As described above, a "denial-of-service" should be broadly construed to refer to any degradation of a tenant's service to a point below an acceptable response time and/or transaction throughput rate, whether or not the attack leads to a full rejection of service for legitimate users. A denial-of-service may occur deliberately, namely, as a result of an intentional act, or it may occur without direct intention on the part of the accessor(s) whose activity creates the situation.

Without limitation, the application profile generator may be implemented as a web-based configuration tool and a set of back-end management processes. The functions in the profile generator 502 and pre-processing 504 and DoS action sub-systems may be shared or common, local or remote, and accessible over a network, typically via a secure link. There may be one or executing instances of the profile generator and the pre-processing proxy and the DoS action component depending on implementation and workload. When multiple instances are executed, additional hardware and software support (e.g., load balancing, name servers, back-end databases, etc.) may be used.

The application profiles provide a generalized characterization of legitimate behavior for each of one or more tenant applications (or "types" of such applications), wherein the legitimate behavior typically is defined as a mapping of application functionality to acceptable workload (typically in terms of resource usage or performance). In a representative embodiment, a set of application "usage profiles" (or "profiles") are generated (or are provided from a source of such information).

Figure 6:
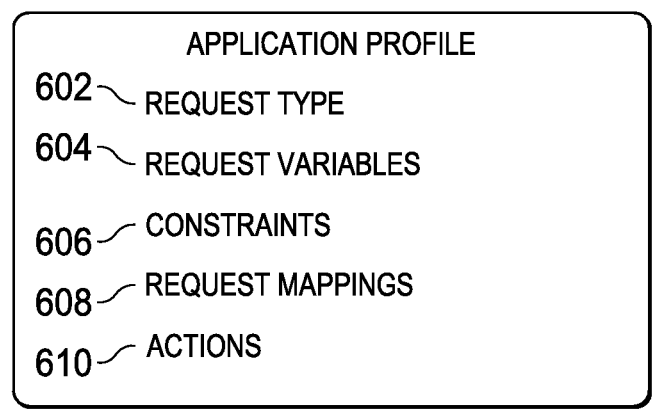
FIG. 6 illustrates a representative format of an application profile according to this disclosure.

Typically, a profile comprises a set of information, which may be defined as a set of XML-encoded data sets contained in a text file. FIG. 6 illustrates a representative profile. A profile 600 typically comprises the following set of information, e.g., encoded as ASCII string values): a request type 602, one or more request variables 604, one or more constraints 606, one or more request mappings 608, and one or more actions 610. A request type defines a request associated with an application or application instance, one or more other requests or request types that may be combined with the request, and the like. A request variable 604 may have one or more different attributes, such as a type of payload, a file size or type, source, time, etc. A constraint 606 represents acceptable workload in response to a particular request (or request combination). Typically, a constraint is a maximum permitted workload for the application, wherein the permitted workload may be defined by some attribute or characteristic. In certain circumstances, such as where the constraint is applied across multiple requests, it also may contain a notion of time. Some representative constraints (for a single request) may be: response size, number of triggered application operations, zip file expansion size, and the like.

A "request mapping" 608 maps a request variable to a constraint directly, or indirectly (e.g., by calculating a value that can be compared to the constraint). The following are some representative request mappings: looking at a request variable to determine a size of a response (e.g., a list or file size(s) to be downloaded), looking at a request variable to determine a number of internal operations triggered (e.g., where a payload defined using a notation such as JSON can be used to trigger multiple backend operations), looking at a request variable to calculate a cost of internal operations triggered in terms of CPU usage, disk I/O (e.g., where the payload can trigger multiple backend operations), and so forth. When a request mapping triggers a constraint, one or more of the defined actions 610 are then taken. Thus, the application profile defines how a request can be mapped to a workload (the constraint) to determine whether or not the request is within policy. The above-describes request mapping(s) and constraint(s) are merely representative, and functions (e.g., Boolean or other operations) that combine one or more may be configured. In addition, one or more request mappings or constraints may be tied to occurrence of a given additional condition or occurrence.

The one or more actions 610 may include action types, and action parameters. An action type is an action to return if a constraint in the profile is triggered (fired). Preferably, the action is read from the profile and returned by default without interruption. An action parameter (e.g., a number of seconds to delay for a request delay action type) is applied to an action type. Preferably, the action parameter is also returned from the profile without interruption.

The particular nomenclature and syntax of the application profile is not intended to be limiting, as of course other formats and phrasing may be used without altering the basic principles described above. One or more of the defined attributes also may be combined or supplemented with additional information or conditions.

Preferably, a user interface includes a configuration tool (e.g., a network-accessible set of pages) by which a permitted user configures an application profile such as described above. There may be a set of default application profiles for one or more use case scenarios, and a particular tenant may have access to different set(s) of profile templates depending, for example, on the customer's status (e.g., gold, silver or bronze level). Certain fields in an application profile template may be masked or inaccessible for certain persons or entities. Thus, there may be different application profile templates that are accessible for different users, such as administrators, tenants, tenant prospects, other third parties, and the like. An application profile may be static or dynamic, and it may be pre-configured or configured manually, automatically or programmatically.

Figure 7:
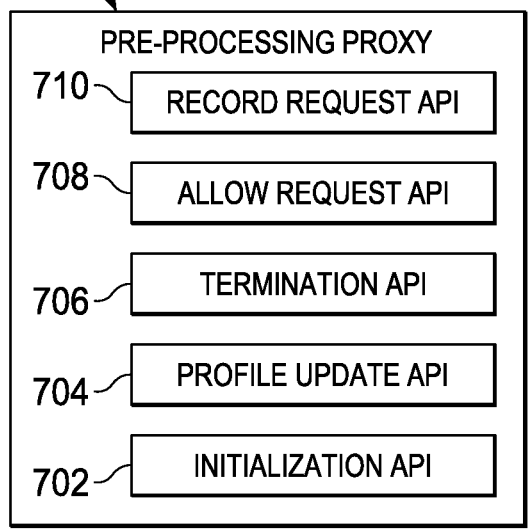
FIG. 7 illustrates a block diagram of the pre-processing and DoS action sub-systems according to this disclosure.

FIG. 7 illustrates a representative pre-processing proxy 700. Preferably, the usage monitor provides a set of APIs and processing components that include the following: initialization 702, application profile update 704, termination API 706, allow request determination component 708, and logging API 710. The initialization API 702 causes the pre-processing proxy to be initialized. Upon initialization, preferably the proxy reads all application profiles that have been configured and/or are retrieved to the proxy. The update application profile API 704 causes all application profiles to be re-read and to become current. The termination API 706 terminates the proxy operation. The allow request determination component 708 receives the one or more application requests as inputs, and returns the corresponding action type and action parameter, depending on the analysis. Preferably, the allow request determination component 708 is called before every application request is processed. During this processing, the proxy checks the applicable constraints for the application profile(s) at issue and, if any constraint fires, the API returns the corresponding action type and/or action parameter. In this manner, the proxy determines whether the request(s) can be mapped to the workload constraint(s) and thus whether the request(s) are within policy for the application profile. Preferably, the logging API 710 is called after every request completes to log the results of this processing.

As noted above, preferably the proxy (through the allow request determination component 708) performs processing on the request to analyze how the request will impact resource workload. The nature and scope of this analysis will depend on the request itself, but typically the analysis involves the proxy determining the processing and storage resources that are anticipated to be impacted by the request. The analysis may involve the pre-processing proxy starting one or more execution threads, allocating memory, making simulated API calls, unzipping files, performing substantive analysis on files and data, etc., to evaluate the anticipated application workload if the request is permitted to proceed.

The profile generator, proxy and DoS action framework is not limited to enforcing a single fixed profile per application. A given application profile may differ from another application profile with respect to one or more of the following: request, request variables(s), request mapping(s), constraint(s), or action(s). Further, more than one application profile may be applied to a given request and/or applied to a request for a given time interval. There may be different levels of constraints applied for shorter durations (e.g., a few seconds) versus longer durations (e.g., an hour) Or, different actions may be applied to different limits. If a constraint in more than one profile fires for a request, the action type (and corresponding action parameter, if any) returned preferably is a highest one (in an ASCII sort order for example). This type of flexibility enables applications that use the proxy (and its APIs) a simple and effective way to create levels of action types without the proxy having to interpret/manage them.

The pre-processing (or an instance thereof) may be implemented in software (as a computer program) executing in a hardware processor. One or more data structures associated therewith store the application profiles or data therein. A database may be used to store application profile data in any convenient manner. In one embodiment, the application profile data and the application profiles are stored in a hash table that is keyed by a request identifier with zero or one entry per key. A linked list (with a first entry being the oldest) may then be associated with each request entry in the hash table, with one for every request that has been processed, e.g., within a time window or from a request source. The hash table may be periodically updated (e.g., by a background daemon) to remove requests from the table, to thereby maintain the size of the table manageable for use in a working memory.

Preferably, the one or more action(s) performed when a constraint is fired will depend on the request and the application. This is a not a limitation, as there may be a pre-configured or pre-defined set (or sequence) of actions that are system-imposed. The service provider may provide a set of default action(s) or action sequences, or certain action(s) or action sequences may be imposed on the consuming application(s) by default, manually, automatically or programmatically. Typically, a request has a defined set of one or more actions. The actions may be implemented all at once, or in some predefined or configurable sequence. One such sequence that may be implemented may be as follows: throttling the request, denying the request, restricting the request to running by itself or with certain defined other requests, etc. Of course, other sequences (or no sequence) may be configured and instantiated. The particular sequence may also be specified in the profile.

The mechanism of this disclosure may be implemented with respect to a single hosted application, or across multiple such applications (operating within the cloud environment concurrently). Typically, at least first and second tenants will use different application profiles.

Figure 8:
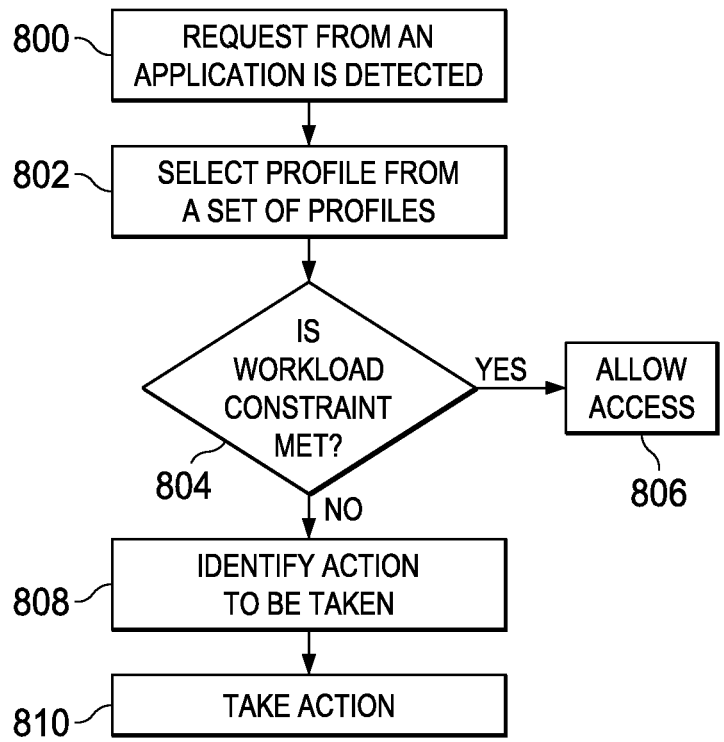
FIG. 8 illustrates a process flow of the pre-processing and DoS action components in a representative embodiment.

FIG. 8 illustrates a representative process flow for the proxy and DoS action components. As noted above, typically there will be multiple instances of the proxy, although this is not a requirement. The process assumes that application profiles are defined and the proxy initialization API has been called. At step 800, a request for an application is detected. Based on the request type or some other identifier, and before the request is processed in the cloud system, a profile of the set of application profiles is selected at step 802. As noted above, the application profile defines an allowed amount of acceptable workload, preferably over a given time period (the request time window), typically for a given request type. What constitutes an allowed "workload" typically will vary for each application profile, and it is defined by the particular constraint or constraints set forth in the applicable profile. At step 804, a test is performed to determine whether the request is permitted to access the application (e.g., based on the one or more constraints in the selected profile). If the outcome of the test at step 804 indicates that the request should be permitted (because some constraint in the application profile is not yet triggered), the routine continues at step 806 to allow the request. As described above, the constraint may be of various types. If, however, the outcome of the test at step 804 is negative, an action is determined at step 808, using the action data specified in the profile. At step 810, the DoS action component takes the action based on the action data returned, and the process terminates with respect to the request.

The following provides several use cases illustrating how the basic technique operates. Assume that the application profile identifies that an acceptable workload for a given request type is to allow x transaction from a given client or IP address in time y. As described above, the profile may also specify how a payload of the request type maps to a number of operations and specifies limits, e.g., a JSON payload may map to multiple API requests. The pre-processing proxy performs an analysis on each request to determine if the request complies with such application profile(s). Thus, the proxy might check the JSON payload to determine the number of operations that are anticipated to be performed (e.g., an XML payload creates 50 activities with each activity resulting in 50 events). In operation, and as described above, the pre-processing proxy analysis may involve a separate processing, such as unzipping suspect files in a separate execution thread to determine if they will be a drain on memory when decompressed at the application. The proxy may also implement logic to combine requests based on different criteria (e.g., requests originating from a same IP address or client) and then determine whether the combined requests trigger some criteria in an application profile. The criteria may be varied and may include, request source, request timing, an identifier associated with the request accessor, or the like. The application profile typically provides details of what action to take for different scenarios detected, e.g., where the number of potential API calls is >x, then throttle the request; or, if the number of potential API calls is greater than an upper threshold, reject the request.

Thus, assume that a request calls REST-based APIs with JSON payload. The pre-processing proxy would parse on the JSON file and calculate a number of resulting thread or API calls that would be triggered and decide whether to proceed. That decision need not necessarily be an atomic decision and may just include total workload triggered against the application within a time period, or total workload by a particular calling identity or IP address.

As noted above, a given application profile may also define one or more constraints in the context of multiple requests (taken in combination). To address multiple requests, the pre-proxy processor includes the ability to link requests based on some defined criteria, such as authenticated user (e.g., a session identifier, or equivalent), IP address of the requesting machine, or the like. The application profile also is provisioned to define application workload based either on a combination of different requests, on a series of the same request over some specified time period, or the like. The example scenario above shows how a series of the same JSON request can violate a constraint. Preferably, the proxy maintains a running total of requests, as well as the results of mapping each request to a constraint, so that multiple requests can be linked as defined in the profile and the workload(s) analyzed against the constraint(s).

The approach herein is quite flexible and may have numerous variants. Thus, for example, the decision regarding which particular application profile to select from the set of application profiles may depend on an identity or, or some other characteristic associated with, the particular tenant, or a determination of which tenant a particular accessor is associated. The approach also preferably includes a configuration management sub-system (or leverages an existing one in the cloud infrastructure) to add new application profile(s) or to add new types of application profile constraints as different or new types of applications or accessors start to use the infrastructure. The management sub-system may also provide for the specification and enforcement of actions to prevent or mitigation resource over-utilization other than just providing an escalating set of actions (such as described above). Other actions may include, without limitation, pushing requests into a waiting queue before allowing access, restricting a number of self-service trials, restricting access from a given number of indirect users (i.e., those that third parties who use products through the hosted application), and the like The mechanism, which is designed to pre-process requests, may be implemented alone or in combination with a profile-based system that uses accessor profiles and that operates as requests are being actually carried out in the shared infrastructure.

The profile generation, proxy and DoS action functions may be part of an existing cloud management functionality (e.g., BSS, OSS, or other directory service), or they may be an extension or adjunct to some other cloud function, operation or mechanism.

The techniques described herein provide significant advantages over the prior art by preventing application-level denial-of-service attacks in a multi-tenant collaborative SaaS system. Using the approach, legitimate users and usage of the service may continue with acceptable response time and transaction throughput rates. The approach further ensures that denial-of-service attacks do not lead to rejection of service for legitimate users or otherwise create business-impacting support situations. The techniques enable detection and prevention of abusive usage of cloud resources, as well as prevention of subsequent denial-of-service attempts by intentional abusers. The mechanism is dynamic and can readily adapt to new behaviors (both good and bad), and it is flexible and thus able to allow for new, specifically allowable use cases (e.g., when an application in the SaaS business decides to allow certain behavior). In summary, the approach herein thus provides a general service to allow applications to avoid abuse of their service in the context of a collaborative, multi-tenant SaaS system.

One or more aspects of the described functionality described above may be implemented as a standalone approach, e.g., a software-based function executed by a processor, although the preferred implementation is as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the inactivity tracking and management functionality is implemented in software, which includes but is not limited to firmware, resident software, microcode, and the like. Furthermore, denial-of-service mechanism and/or particular functions therein can take the form of a computer program product accessible from a computer-usable or computer-readable non-transitory medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Storage devices may include removable media, such as SD cards. The computer-readable medium is a tangible, non-transitory item. Any of these devices can be used to store the authentication or other status information described above.

Any cloud datacenter resource may host denial-of-service mechanism or its components as described herein.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the denial-of-service mechanism is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the pre-processing and denial-of-service prevention functionality provided herein may be implemented as an adjunct or extension to an existing cloud compute management solution.

The techniques described herein may be used in any virtual client-server environments.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. Apparatus, comprising:
a processor;
computer memory holding computer program instructions that when executed by the processor minimize application-level denial-of-service with respect to compute resources in a multi-tenant shared infrastructure, the computer program instructions comprising:
program code to profile anticipated application behavior in response to one or more requests to generate an application profile having at least one workload constraint, the application profile including a mapping of a request type to a workload and a workload limit;
program code operative upon receipt of a request, and prior to execution, to determine whether execution of the request satisfies the at least one workload constraint in the application profile by evaluating whether the request is predicted to result in a workload that exceeds the workload limit, wherein evaluating whether the request is predicted to result in a workload that exceeds the workload limit includes unzipping a file associated with the request in a separate execution thread to determine if decompression of the file results in the workload that exceeds the workload limit; and
program code, responsive to determining whether execution of the request satisfies the at least one workload constraint in the application profile, to take a given action.

2. The apparatus as described in claim 1 further including program to take that given action that is one of: throttling execution of the request, rejecting the request, and providing a given notification.

3. The apparatus as described in claim 1 wherein the program code to determine whether execution of the request satisfies the at least one workload constraint includes program code to allocate processing or storage in the multi-tenant shared infrastructure to simulate how execution of the request affects availability of the compute resources.

4. The apparatus as described in claim 1 wherein the program code to evaluate executes a number of application operations in a separate execution thread to determine if the number of application operations in the workload exceeds the workload limit.

5. A computer program product in a non-transitory computer readable medium for use in a data processing system, the computer program product holding computer program instructions which, when executed by the data processing system, minimize application-level denial-of-service with respect to compute resources in a multi-tenant shared infrastructure, the computer program instructions comprising:
program code to profile anticipated application behavior in response to one or more requests to generate an application profile having at least one workload constraint, the application profile including a mapping of a request type to a workload and a workload limit;
program code operative upon receipt of a request, and prior to execution, to determine whether execution of the request satisfies the at least one workload constraint in the application profile by evaluating whether the request is predicted to result in a workload that exceeds the workload limit, wherein evaluating whether the request is predicted to result in a workload that exceeds the workload limit includes unzipping a file associated with the request in a separate execution thread to determine if decompression of the file results in the workload that exceeds the workload limit; and
program code, responsive to determining whether execution of the request satisfies the at least one workload constraint in the application profile, to take a given action.

6. The computer program product as described in claim 5 further including program to take that given action that is one of: throttling execution of the request, rejecting the request, and providing a given notification.

7. The computer program product as described in claim 5 wherein the program code to determine whether execution of the request satisfies the at least one workload constraint includes program code to allocate processing or storage in the multi-tenant shared infrastructure to simulate how execution of the request affects availability of the compute resources.

8. The computer program product as described in claim 5 wherein the program code to evaluate executes a number of application operations in a separate execution thread to determine if the number of application operations in the workload exceeds the workload limit.

9. The apparatus as described in claim 1 wherein the anticipated application behavior characterizes legitimate behavior for each of one or more tenant applications in the multi-tenant shared infrastructure.

10. The apparatus as described in claim 9 wherein the anticipated application behavior is profiled as a machine-encoded data set.

11. The apparatus as described in claim 1 wherein determining if decompression of the file results in the workload that exceeds the workload limit evaluates drain on system memory.

12. The computer program product as described in claim 5 wherein the anticipated application behavior characterizes legitimate behavior for each of one or more tenant applications in the multi-tenant shared infrastructure.

13. The computer program product as described in claim 11 wherein the anticipated application behavior is profiled as a machine-encoded data set.

14. The computer program product as described in 5 wherein determining if decompression of the file results in the workload that exceeds the workload limit evaluates drain on system memory.

* * * * *